United States Patent [19]
Balfanz, Jr.

[11] 3,788,001
[45] Jan. 29, 1974

[54] LAWN EDGING STRUCTURE
[76] Inventor: Glenn F. Balfanz, Jr., Hampton Ave., Western Springs, Ill. 60558
[22] Filed: June 12, 1972
[21] Appl. No.: 262,117

[52] U.S. Cl. .................................. 47/33, 404/7
[51] Int. Cl. .................................. A01g 1/08
[58] Field of Search ............. 47/32, 33; 94/31; 404/6–8

[56] References Cited
UNITED STATES PATENTS

| | | | |
|---|---|---|---|
| 3,387,786 | 6/1968 | Rynberk | 47/33 UX |
| 1,977,021 | 10/1934 | Spencer | 47/33 |
| 3,378,949 | 4/1968 | Dorris | 47/33 |
| 3,484,989 | 12/1969 | Lazinsky | 47/33 |
| 3,485,449 | 12/1969 | Wilson | 47/33 X |
| 3,495,352 | 2/1970 | Sbare | 47/33 |
| 3,545,127 | 12/1970 | Jensen | 47/33 |

Primary Examiner—Robert E. Bagwill
Attorney, Agent, or Firm—John J. Kowalik

[57] ABSTRACT

A plastic extruded lawn edging comprising a T-section including vertical wall and a wide transverse upper head portion which extends inwardly of the wall toward the flower bed and outwardly toward the grass and provides a shade area to prevent the growth of vegetation. In one embodiment a C-shaped connector interconnects the ends of adjacent sections. Another embodiment utilizes a connector which bridges the wall portion of adjacent sections and is slidably fitted between the head of the T and an angled anchor flange at the bottom of the walls.

7 Claims, 14 Drawing Figures

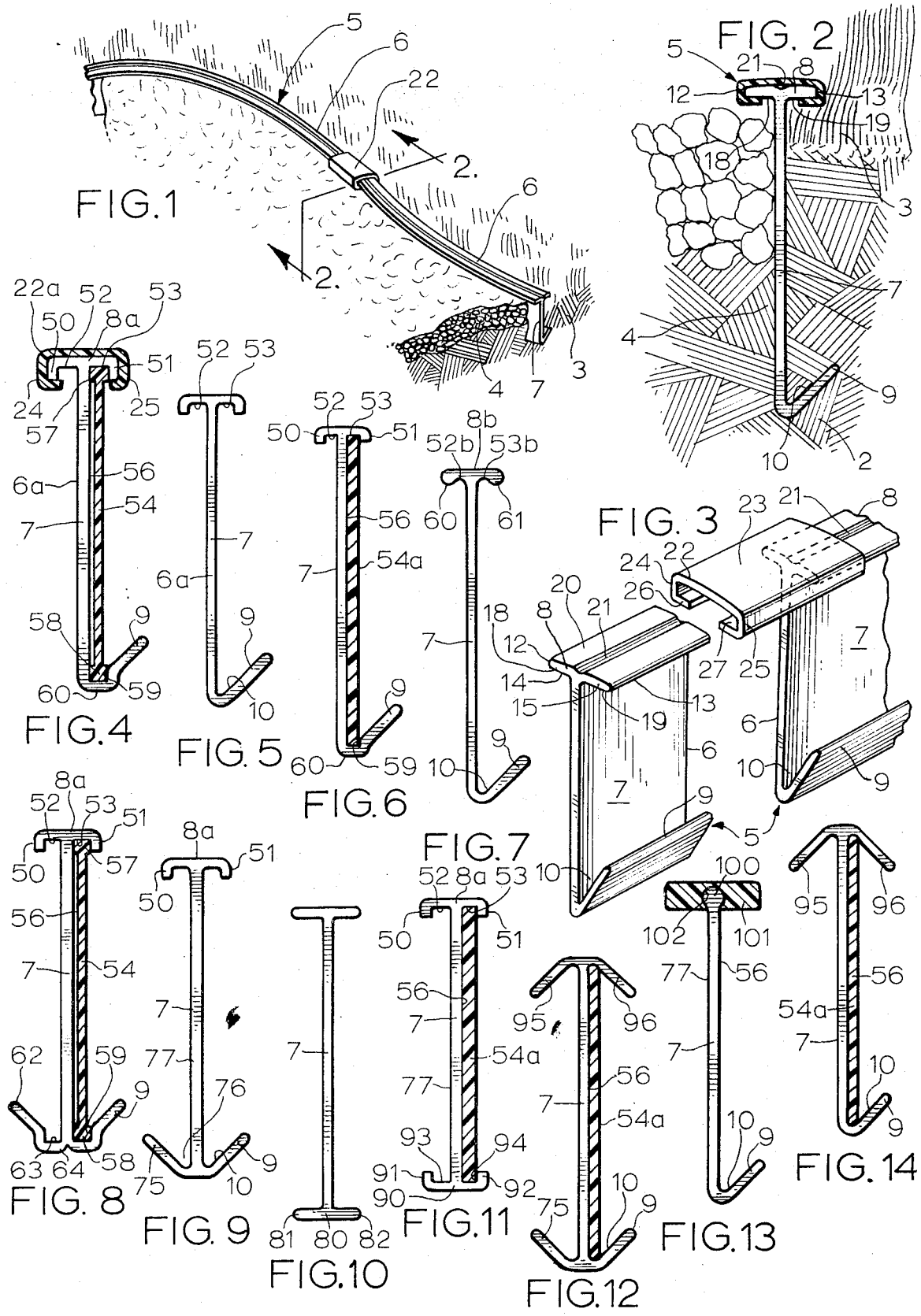

LAWN EDGING STRUCTURE

DISCUSSION OF THE PRIOR ART

The best known prior art is U.S. Pat. No. 3,387,786. It comprises a tubular upper portion with a central passage therein. The problem with this type of structure resides in the difficulty of manufacture, which is relatively costly. It is not especially aesthetic since it rises above the ground level and looks like a coiled hose. The curved periphery does not adequately shade the ground adjacent to the tube so that grasses grow close and are difficult to cut. In addition, the hose portion projects too far from the ground so that it is easily apt to be cut by rotary mowers.

SUMMARY OF THE INVENTION

This invention is concerned with border dividers and more specifically with a flexible and relatively inexpensive divider which has an enlarged upper portion adapted to lay flat upon the ground and define an aesthetically pleasing border.

A more specific object is to provide a plastic divider of novel construction which is flexible and easy to mold to curving contours.

In several embodiments of the invention a novel interconnecting filler panel is utilized which bridges the vertical walls of the adjacent sections and at its upper and lower edges fits into upper and lower grooves in the bottom of the head of a T, and in the top of an anchor flange at the lower edges of vertical divider walls of abutted sections.

A corollary object of the invention is to provide novel interlocking means between the ends of adjacent divider sections which also serves as a barrier against roots which would normally, if only the upper portions of the sections are connected, grow through the seam between the sections.

These and other objects and advantages inherent in and encompassed by the invention will become more readily apparent from the specifications and the drawings wherein:

FIG. 1 is a fragmentary perspective view illustrating one form of device in normal position in the ground;

FIG. 2 is an enlarged cross-sectional view taken substantially on line 2—2 of FIG. 1;

FIG. 3 is a spaced apart perspective view of the adjacent ends of two divider sections and connector therefor;

FIG. 4 is a vertical section showing another form of the invention;

FIG. 5 is an edge view of another embodiment of the invention;

FIG. 6 is an edge view of still another form with a connector shown in vertical section;

FIG. 7 is a still further embodiment;

FIG. 8 is another embodiment similar to FIG. 6;

FIG. 9 is an edge view of a further embodiment; and

FIGS. 10–14 are edge views of still further embodiments.

DESCRIPTION OF THE INVENTION OF FIGS. 1-3

The device is shown located in the ground between a grass area 3 and flower or garden bed or plot 4 and comprises a divider generally designated 5.

The divider is preferably made of several sections 6,6 which are usually twelve to twenty feet long, although it may be made of one continuous piece. The one piece, however, is heavy and difficult to handle. Each section or segment is generally T-shaped in cross-section and is extruded from plastic such as polyethylene or polypropylene. It comprises a deep vertical wall or web 7, and an upper, integral transversely extending horizontal flange strip or head 8 and an anchor flange 9 extending diagonally laterally upwardly from the lower edge of wall 7 and forms with the wall 7 an upwardly open V-shaped pocket 10 into which dirt impacts to hold the device into the ground.

The upper flange 8 is centered between its lateral edges 12 and 13 with respect to web 7. The portions 14 and 15 of the flange 8 provide flat bottom surfaces 18,19 which, if desired, are adapted to lay upon the ground and provides an effective cover and shield against the sun to prevent plant growth adjacent to the divider. The top surface 20 is generally flat and provided with a longitudinal groove 21 in alignment with wall 7. The head flange 8 provides a low profile close to the ground and defines a delineating outline or border between the grass and bed.

As best seen in FIG. 3, a connector 22 is utilized to connect adjacent sections. The connector is generally C-shaped in cross section and comprises a top wall 23 depending side flanges 24,25 which flank the edges 12 and 13 of the head flange 8. Inturned or reentrant flanges 26,27 extend inwardly from the lower edges of flanges 24,25 and project under the bottom surfaces 18 and 19 of both connected sections. The upper web 23 overlies the top sides 20 of respective head flanges. The ends of the connector are sleeved over corresponding lengths of the flanges of respective sections and provides an adequate and aesthetic connection between the adjacent sections. In this embodiment the groove 21 permits lubricant such as water to seep into the connection to permit separation and telescoping. Also during summer space is provided for expansion and flexibility is enhanced for distortion, due to heaving or ice formations on the divider, in the winter.

In the following embodiments parts identical with those of the previous embodiments will be identified with the same reference characters.

EMBODIMENT OF FIG. 4

In this embodiment the head flange 8a is formed at its lateral edges with depending flanges 50,51 which form longitudinal downwardly open grooves 52,53 along the opposite sides of the web or wall 7. A connector plate or panel 54 lays along one side 56 of the wall 7 and at its upper and lower edges is provided with thickened edgings or beads 57,58. The upper bead 57 fits complementally into the groove 52 and the lower bead fits into a complementary upwardly open groove 59 which is formed in the upper side of the junction corner structure 60 formed between the anchor flange 9 and the lower edge of wall 7. This panel 54 is partly slid in endwise into one section 6a and then the remainder is slid into the abutting section thus connecting the two sections. The connector 22a is similar to connector 22 but flanges 24 and 25 are deeper. It connects the head portions in the same manner as previously described.

EMBODIMENT OF FIG. 5

In this embodiment the head portion 8a is identical with that of FIG. 4, but the bottom anchor flange 9 is the same as shown in FIGS. 1–3.

EMBODIMENT OF FIG. 6

In this embodiment the connector 22a is eliminated and beads 57,58 are also eliminated. The panel 54a is flat and the widths of grooves 52a,59 are narrower than in FIG. 4 and snugly admit the panel 54a.

EMBODIMENT OF FIG. 7

In this embodiment the edges of the head flange 8b are formed with bottom beads 60,61 which form grooves 52b,53b.

EMBODIMENT OF FIG. 8

In this modification, the structure is essentially identical with FIG. 4 except that an additional flange 62 is provided which extends from the bottom edge of wall 7 in a direction opposite to flange 9 and provides an upwardly, open longitudinal groove 63 in its corner structure 64 into which panel 54 may be fitted and also into the upper groove 52. Panel 54 is shown in grooves 53,59.

EMBODIMENT OF FIG. 9

This embodiment is similar to FIG. 5, except that it is provided with an oppositely extending lower edge diagonal anchor flange 75 which forms pocket 76 with side 77 of wall 7.

EMBODIMENT OF FIG. 10

In this embodiment the divider is symmetrical. The bottom edge of wall 7 is provided with a transverse horizontal flange 80 which is centered between its lateral edges 81 and 82 on the center line of wall 7.

EMBODIMENT OF FIG. 11

The structure of FIG. 11 is a duplication of the upper half of FIG. 5 and the lower edge of the wall 7 is provided with a horizontal flange 90 which at its lateral edges is provided with upstanding edge flanges 91 and 92 which define with the sides 56 and 77 of the wall 7 grooves 93,94. The connector panel extends along the sides 77 or 56 of adjacent sections and at its top and bottom edges into slots 52,93 or 53,94.

EMBODIMENT OF FIG. 12

In FIG. 12 the bottom anchor flanges 75,9 are the same as those in FIG. 9 and the panel 54 extends along sides 77 or 56 and the upper head is formed with downwardly diverging flanges 95,96 and the corners form slots to receive the upper and lower edges of the connector panel 54a.

EMBODIMENT OF FIG. 13

In FIG. 13 the upper edge of the wall 7 is formed with a bead 100 and a transversely widened connector strip 101 with a complementary downwardly open groove 102 provided to connect adjacent sections.

EMBODIMENT OF FIG. 14

In this embodiment the lower flange 75 is eliminated and the flanges 95 and 96 are provided at the upper edge of the wall 7. The panel 54 fits into the upper and lower pockets.

In each embodiment the upper and lower flanges are flexible to accommodate frost heaving without breaking.

Thus it will be noted, that various modifications have been disclosed within the scope of the invention and that in each the head flange is adapted to press against the ground to act as a sun shade except for FIG. 13 wherein the connector is provided which may extend the full length of the divider.

Various other forms will now become apparent which are intended to be covered hereby as set forth in the appended claims:

What is claimed is:

1. A divider assembly for landscaping comprising extruded end to end positioned sections of plastic material, each section having an upper head portion comprising elongated head flange means adapted to lay upon the ground, a vertical divider wall beneath the head flange means connected thereto and centered between the lateral edges thereof, said head flange means extending laterally with respect to said vertical wall, anchor flange means connected to the bottom edge of the wall and projecting laterally beyond at least one side thereof at an acute angle thereto and opposing said head flange means, and a connector of C-shape in cross-section telescoped over portions of the head flange means at adjacent ends of said sections.

2. The invention according to claim 1 and said head flange means of each section comprising flanges extending from the upper edge of the respective said wall beyond opposite sides thereof and diverging downwardly.

3. The invention according to claim 1 and a connector panel fitted between said anchor flange means and head flange means at its lower and upper edges and interconnecting said sections.

4. A divider assembly for landscaping comprising end to end positioned sections of plastic material, each section having an upper head portion comprising horizontally elongated head flange means adapted to lay upon the ground, a vertical divider wall beneath the head flange means connected thereto and centered between the lateral edges thereof, anchor flange means intergral with the bottom edge of the wall and projecting laterally thereof diagonally upwardly from the wall on at least one side thereof, each of said head flange means comprising a horizontally disposed strip of material having an upper side with a longitudinal combination expansion and lubrication groove in its upper side, and a C-shaped connector sleeved endwise onto said strip and having a horizontal upper wall overlying the upper side of said strip and having depending lateral flanges embracing said strip along its lateral edges and having reentrant bottom flanges underlying the bottom side of said strip at opposite sides of said wall and defining a slot therebetween.

5. The invention according to claim 4 and a connector panel extending from said slot to the angle formed by said anchor flange and said vertical wall.

6. The invention according to claim 5 and said panel having upper and lower stiffener beads at the upper and lower edges thereof, and additional anchor flange means integral with said divider wall and extending oppositely therefrom with respect to said first mentioned anchor flange means.

7. The invention according to claim 6 and said flange means at the upper and lower ends of said wall being flexible and adapted to be deflected to accommodate frost heaving without breaking.

* * * * *